United States Patent
Al Zaydi et al.

(10) Patent No.: US 10,444,528 B2
(45) Date of Patent: Oct. 15, 2019

(54) POP-UP VIRTUAL REALITY VIEWER FOR AN ELECTRONIC DISPLAY SUCH AS IN A MOBILE DEVICE

(71) Applicant: KING ABDULLAH UNIVERSITY OF SCIENCE AND TECHNOLOGY, Thuwal (SA)

(72) Inventors: Abdulwahid Awad Al Zaydi, Thuwal (SA); Mohammed Awad Al Zaydi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 112 days.

(21) Appl. No.: 15/574,676

(22) PCT Filed: May 18, 2016

(86) PCT No.: PCT/IB2016/052916
§ 371 (c)(1),
(2) Date: Nov. 16, 2017

(87) PCT Pub. No.: WO2016/185410
PCT Pub. Date: Nov. 24, 2016

(65) Prior Publication Data
US 2018/0292665 A1    Oct. 11, 2018

Related U.S. Application Data

(60) Provisional application No. 62/163,992, filed on May 20, 2015.

(51) Int. Cl.
G02B 27/22    (2018.01)
A63H 33/38    (2006.01)

(52) U.S. Cl.
CPC ......... *G02B 27/2257* (2013.01); *A63H 33/38* (2013.01)

(58) Field of Classification Search
CPC  G02B 27/2257; G02B 27/2228; G02B 27/22; G02B 7/021; A63H 33/38; H04M 1/026
(Continued)

(56) References Cited

U.S. PATENT DOCUMENTS 4,468,020 A    8/1984  Wallace
9,804,393 B1 *  10/2017  Coz ................... G02B 27/0176
(Continued)

FOREIGN PATENT DOCUMENTS

CA    2225075 A1    9/1999
WO    2012035174 A1    3/2012

OTHER PUBLICATIONS

International Search Report in related International Application No. PCT/IB2016/052916, dated Jul. 22, 2016.
(Continued)

*Primary Examiner* — William R Alexander
(74) *Attorney, Agent, or Firm* — Patent Portfolio Builders PLLC

(57)    ABSTRACT

A virtual reality viewer may be integrated with printed materials, such as pamphlets, flyers, magazines, or books. A user may be able to review the printed material regarding the advertised products or services and then activate a virtual reality scene on an electronic display, such as the user's mobile device, that provides the user with more information regarding the products or services. The virtual reality viewer may be attached to pages in the printed materials and constructed in a manner such that the viewer pops up when the pages are opened. The user may place a mobile device
(Continued)

in the viewer and/or access an integrated display to view a virtual reality scene related to content in the printed materials.

23 Claims, 11 Drawing Sheets

(58) Field of Classification Search
USPC .......................................................... 359/474
See application file for complete search history.

(56) References Cited

U.S. PATENT DOCUMENTS

| | | | |
|---|---|---|---|
| 9,869,865 B2* | 1/2018 | Vinzant | G02B 27/0176 |
| 2014/0009828 A1 | 1/2014 | Plotkin | |
| 2016/0232713 A1* | 8/2016 | Lee | G06T 19/006 |
| 2016/0232715 A1* | 8/2016 | Lee | G06T 19/006 |
| 2016/0349836 A1* | 12/2016 | Goossens | G06F 3/011 |
| 2017/0199385 A1* | 7/2017 | Kong | G02B 27/0176 |
| 2018/0292666 A1* | 10/2018 | Kong | G02B 27/2257 |

OTHER PUBLICATIONS

Written Opinion of the International Searching Authority in related International Application No. PCT/IB2016/052916, dated Jul. 22, 2016.

\* cited by examiner

POP-UP VIRTUAL REALITY VIEWER FOR AN ELECTRONIC DISPLAY SUCH AS IN A MOBILE DEVICE

CROSS-REFERENCE TO RELATED PATENT APPLICATIONS

This application is a National Stage of PCT/IB2016/052916 filed May 18, 2016, which claims the benefit of priority of U.S. Provisional Patent Application No. 62/163,992 to Al Zaydi et al. filed on May 20, 2015 and entitled "Popup Cards Form the Virtual Reality Viewer," which are hereby incorporated by reference in their entirety.

FIELD OF THE DISCLOSURE

The instant disclosure relates to virtual reality. More specifically, portions of this disclosure relate to virtual reality viewers.

BACKGROUND

Virtual reality is increasing in popularity. One form of virtual reality gaining interest in recent years has been head-mounted glasses that attach a mobile phone to a user's head. The phone screen is then divided in half and each half presented to one of the user's eyes to produce a stereoscopic image of a virtual reality scene. Virtual reality glasses, or the mobile device itself, may include sensors for detecting movement of the head. This allows the display of the computed illustration to be adjusted to a movement of the wearer of the glasses. Thus, the displayed image areas of the virtual reality scene appear considerably larger than the free-standing display screens and in the extreme case even cover the entire field of view of the user. Because the display follows all head movements of the wearer as a result of the head mounting, the user has the feeling of moving directly in a computer-generated image landscape. These head-mountings for holding a user's mobile phone near their eyes have are conventionally fixed, dedicated structures for use for long-term virtual reality experiences. However, these fixed, dedicated structures have drawbacks that limit the application and use of virtual reality.

SUMMARY

Virtual reality may have more applications if satisfactory viewers are made available. For example, the conventional head-mounted viewers described above are limited in application by their rigid, fixed structures that create a bulky viewer. The bulky viewer is difficult to transport due to its size and inflexibility for packaging. As a result, virtual reality using such head-mounted viewers is limited to applications where a user has their own virtual reality viewer. Requiring users to own, a priori, their own viewer significantly limits the potential viewer base for developers of programs that display virtual reality scenes. With an appropriate virtual reality viewer, a viewer may be distributed to many otherwise-inaccessible potential users and thus increase the potential viewership for a program by eliminating the need that the owner has their own viewer.

Such a viewer may open new opportunities for viewing virtual reality scenes. One example application for such a viewer is marketing materials that include advertisements for products. A low-cost viewer may be integrated with marketing materials, such as printed material that include pamphlets, flyers, magazines, or books. A user may be able to review the printed material regarding the advertised products or services and then activate a virtual reality scene on an electronic display and/or a user's mobile device that provides the user with more information regarding the products or services. Another example application for such a viewer is childrens' books that include stories, illustrations, or other pop-ups. A user may be able to purchase a children's book with several pages, in which pop-up scenes corresponding to a different children's story are located between each of the pages. A pop-up viewer located on each of these pages may allow the viewing of a virtual reality scene or multiple scenes corresponding to the children's story that bring the story to life. In some embodiments, the pop-up viewer may include a mobile device holder. When a user flips to a page in the book corresponding to a desired story, the mobile device may be inserted into the mobile device holder of the pop-up virtual reality viewer. In the holder, the mobile device detects an identifier, such as a QR code or an RFID tag, that identifies the story associated with the page, and the mobile device may activate a virtual reality scene corresponding to the story. Each of these examples describes a virtual reality viewer capable of collapsing or expanding to pop-up with an opening of printed materials containing two pages. The viewer includes a display holder for an electronic display that displays a virtual reality scene and includes a lens holder for aligning two lenses to different regions of the electronic display to present the virtual reality scene to a user.

According to one embodiment, an apparatus may include a book, pamphlet, magazine, flyer, or other printed material having a first page and a second page, the first page and the second page being pivotably connected to one another at one end of each of the first page and the second page. Attached to the printed material may be a virtual reality viewer for viewing a virtual reality screen on a mobile device, the viewer being attached at a first side to the first page of the printed material and at a second side to the second page of the printed material. The virtual reality viewer may include a display holder configured to hold the electronic display; and/or a lens holder attached to the display holder and configured to hold lenses for viewing the virtual reality scene. The display holder and the lens holder may each include a transverse crease configured to allow the virtual reality viewer to be collapsed around an axis associated with the transverse crease when the first page and the second page are closed. The display holder may include two openings facing from the display holder toward the lens holder, and the two openings being aligned with two lenses in the lens holder. The transverse crease may be located between the two openings of the display holder to enable stereoscopic viewing of the virtual reality scene on the display located in the display holder.

In some embodiments, an electronic display may be integrated with the display holder. The electronic display may be configured to activate when the first page and the second page are pivotably moved to pop-up the virtual reality viewer. In some embodiments, a switch may be integrated with the pop-up virtual reality viewer, and that switch may couple a power supply such as a battery to the electronic display to activate the electronic display and/or start the display of the virtual reality scene.

In certain embodiments, the electronic display may be part of a mobile device, such as a cellular phone or portable media player. In such an embodiment, the pop-up virtual reality viewer may have a mobile phone holder configured to hold the mobile device in place for viewing the virtual reality scene through lenses. In this embodiment, an apparatus may include a first page and a second page, the first page and the second page being pivotably connected to one another at one end of each of the first page and the second page; and/or a virtual reality viewer for viewing a virtual reality screen on a mobile device, the viewer being attached at a first side to the first page and at a second side to the second page. The virtual reality viewer may include a mobile device holder configured to hold the mobile device; and/or a lens holder attached to the mobile device holder and configured to hold lenses for viewing the virtual reality screen. The mobile device and the lens holder may each include a transverse crease configured to allow the virtual reality viewer to be collapsed around an axis associated with the transverse crease when the first page and the second page are closed. In some embodiments, a transverse crease is aligned approximately in a middle of the mobile device holder, and the transverse crease is configured to align with an alignment line displayed on a screen of the mobile device.

The mobile device holder may include identifiers accessible by the mobile device that activate the mobile device and/or configure the mobile device to play particular content, such as particular virtual reality scenes. In some embodiments, the mobile device holder may include a quick response (QR) barcode configured with an address of materials associated with content on at least one of the first page and the second page. The QR code may be positioned on the mobile device holder to allow the mobile device to scan the QR code before, during, or after insertion into the mobile device holder. In some embodiments, the mobile device holder may include a radio frequency identification (RFID) tag configured with an address of materials associated with content on at least one of the first page and the second page. In any of these embodiments, the printed material may also include one or more pop-up structures attached to at least one of the first page and the second page, the one or more pop-up structures being configured to expand and collapse based on an orientation of the first page to the second page, and the one or more pop-up structures being associated with the content on at least one of the first page and the second page and/or the content associated with the QR code or the RFID tag.

In certain embodiments, a support structure may be attached between the first side of the display holder and the first page and the second side of the display holder and the second page, respectively. The support structure may include a first member aligned substantially parallel to the first page and the second page when open, and the support structure may also include at least two second members aligned substantially perpendicular to the first member and attached between the first member and at least one of the first page and the second page.

In some embodiments, the apparatus may include an enclosure that at least partially surrounds the display holder and the lens holder and that is configured to block at least some external light from entering a space between the display holder and the lens holder. The enclosure may collapse with the virtual reality viewer when the printed material is closed. For example, the enclosure may include a transverse crease along at least one side, the transverse crease of the enclosure aligning with the transverse crease of the display holder and the lens holder. The enclosure may be configured to collapse when the first page and the second page are closed by folding along the transverse crease of the enclosure and extending away from the display holder and the lens holder.

According to another embodiment, an apparatus may include a folding booklet comprising a first page and a second page, a face of the first page facing toward a face of the second page; and a pop-up virtual reality viewer for viewing a virtual reality screen on a mobile device, the viewer being attached to the folding booklet at a first side to the first page and at a second side to the second page. The pop-up virtual reality viewer may include a first latitudinal support member attached to the first page and extending out from the first page when the folding booklet is in an open position; a second latitudinal support member attached to the second page and extending out from the second page when the folding booklet is in the open position; a third latitudinal support member attached at an intersection of the first page and the second page and extending out from the folding booklet when the folding booklet is in the open position; a first longitudinal support member attached to the first latitudinal support member, the second latitudinal support member, and the third latitudinal support member, the first longitudinal support member comprising a crease along a length of the longitudinal support member at a location of an attachment of the first longitudinal support member to the second latitudinal support member, and the first longitudinal support member further comprising two openings for lenses; a second longitudinal support member attached to the first latitudinal support member, the second latitudinal support member, and the third latitudinal support member, the second longitudinal support member being configured to collapse around the second latitudinal support member when the folding booklet is in a closed position, and w the second longitudinal support member comprising two openings facing toward the first longitudinal support member for viewing the mobile device; and/or a third longitudinal support member attached to the first latitudinal support member, the second latitudinal support member, and the third latitudinal support member, the third longitudinal support member being configured to support the mobile device in the pop-up virtual reality viewer.

In certain embodiments, the two openings of the second longitudinal support member may be aligned with the two openings of the first longitudinal support member and configured to provide stereoscopic viewing of content on the mobile device; the folding booklet may also include one or more additional pop-up structures attached to at least one of the first page and the second page, the one or more pop-up structures being configured to expand and collapse based on an orientation of the first page to the second page, and the one or more pop-up structures being associated with the content on at least one of the first page and the second page; the pop-up virtual reality viewer may include a quick response (QR) barcode configured with an address of materials associated with content on at least one of the first page and the second page; and/or the pop-up virtual reality viewer may include a radio frequency identification (RFID) tag configured with an address of materials associated with content on at least one of the first page and the second page.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims.

Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

A virtual reality viewer may be attached to two opposing pages and configured to collapse around an axis corresponding to a pivot point for the two pages, such as around an axis through a spine of a book or other printed material. The viewer may pop-up when pages in the printed material are opened to show the two opposing pages to which the viewer is attached. That is, when the two pages are pivoted around the spine, or other connection between the two pages, that movement of the two pages causes the attached viewer to expand by "popping-up." The viewer continues to expand as the two pages continue to be pivoted to open the printed material, until the viewer is fully expanded, or popped up, to allow viewing of an electronic display in the viewer. When the two pages are pivoted around the spine, or other connection between the pages, to close the printed material, the viewer may collapse around the pivot point for the two pages. Thus, the printed material may be closed with only a minor protuberance from the viewer's attachment to the pages.

The collapsing and expanding, also referring to as the "pop-up" functionality, of the virtual reality viewer may be supported by various aspects of the virtual reality viewer. In some embodiments, creases extending through components of the viewer may support the expanding and collapsing of the viewer. For example, a crease may extend transversely through components of the viewer and may be aligned with a spine or other connection between the two pages to which the viewer is attached. Components of the viewer may collapse along the crease to lay nearly flat between the two pages when closed. Additionally, components of the viewer may be attached is a manner that causes the viewer to collapse in a certain manner to support the pop-up functionality. For example, an enclosure around the viewer may have a crease and attachments that causes a portion of the enclosure to collapse away from a bulk of the viewer that contains the display holder and/or lens holder. Various embodiments of a pop-up virtual reality viewer that embody some or all of these features are illustrated in the following figures. However, the invention is not limited to these embodiments of a pop-up virtual reality viewer. Instead, a pop-up virtual reality viewer may include different combinations of certain features described herein that enable the virtual reality viewer to expand and collapse with the movement of two pages.

Figure 1:
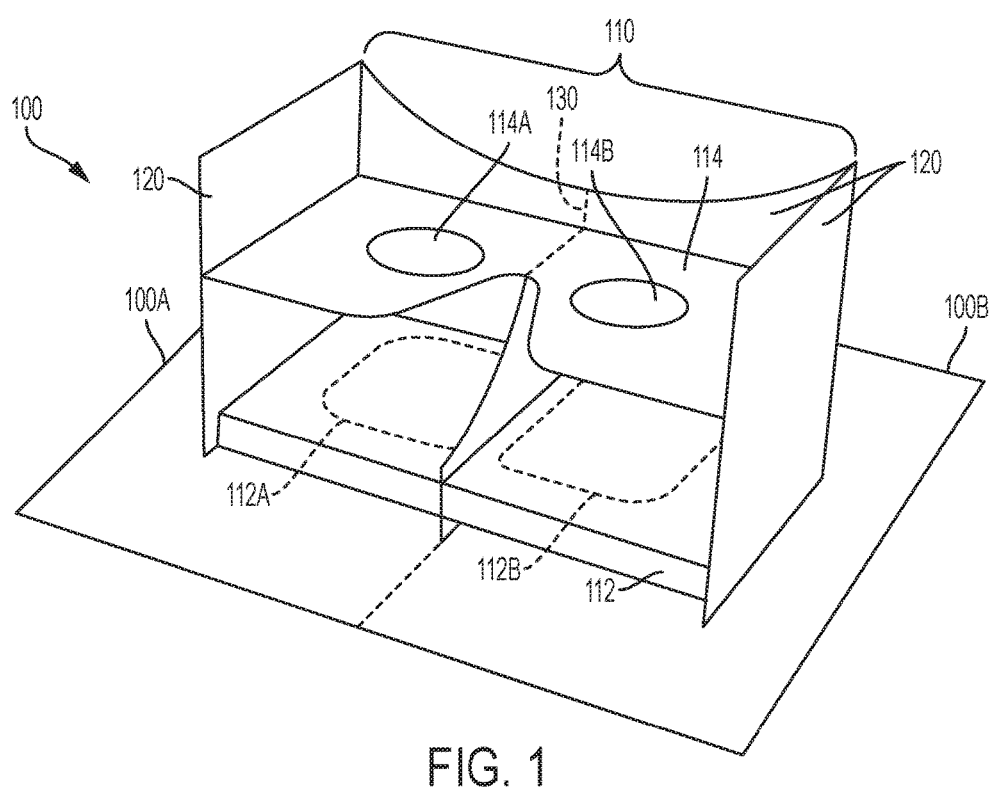
FIG. 1 is a perspective view of a pop-up virtual reality viewer according to some embodiments of the disclosure.

FIG. 1 is a perspective view of a pop-up virtual reality viewer according to some embodiments of the disclosure. An apparatus 100 may include two pages 100A and 100B attached at an axis defined by the intersection of pages 100A and 100B. For example, the pages 100A and 100B may be part of a book or other printed material and may be attached at a spine, or similar connection device, wherein the pages 100A and 100B pivot around the spine or other attachment point. A virtual reality viewer 110 may be attached at one side to the first page 100A and at another side to the second page 100B. The virtual reality viewer 110 may be configured, such as through arrangement of components of the viewer 110 and creases through components of the viewer 110, to collapse inside the two pages 100A and 100B when the pages are closed to lay flat against each other. Likewise, the viewer 110 may be configured to expand and pop-up when the two pages 100A and 100B are opened, such as when a user wants to read content on the pages 100A and 100B.

The virtual reality viewer 110 may include a display holder 112 with openings 112A and 112B. The display holder 112 may accommodate insertion or integration of an electronic display and associated components. For example, the display holder 112 may be a mobile device holder configured to receive a mobile device such as a mobile phone, tablet, or mobile entertainment device. In another example, the display holder 112 may be configured to receive an electronic display such as a liquid crystal display (LCD) or other type of display, such as an e-ink screen. Associated components for an electronic display may include an application processor, a display driver, a battery, and/or communications components such as a Wi-Fi or cellular module. Although various examples are described for insertion in the display holder 112, any component capable of conveying a virtual reality scene to a user may be inserted into the display holder 112. In some embodiments, an electronic display may be integrated with the display holder 112. For example, the electronic display may be flexible, such that the display can be collapsed and expanded with the popping up of the virtual reality viewer 110. In another example, the electronic display may be two separate displays connected by a flexible connector, such as a ribbon cable, that allows the two separate displays to be collapsed and expanded with the popping up of the virtual reality viewer 110 by folding along the ribbon cable. The display holder 112 may be configured to receive any of these example embodiments or other arrangements for display of a virtual reality scene by being sized with dimensions that accommodate such a display. Further, the display holder 112 may be configured to receive a display by including clips, magnets, spacers, folded paper material, or other attachment devices that keep the electronic display in place in the holder 112 during viewing of the virtual reality scene and/or during expanding or collapsing of the viewer 110.

The virtual reality viewer 110 may also include lens holder 114. The lens holder 114 may be configured to receive and hold lenses 114A and 114B. Further, the lens holder 114 may be shaped to fit on or against a user's face to allowing the user to view through the lenses 114A and 114B. The lenses 114A and 114B facilitate the stereoscopic viewing of a virtual reality scene on an electronic display in the display holder 112. In particular, the lenses 114A and 114B may be positioned in the lens holder 114 to focus the user's left and right eyes, respectively, on portions of the electronic display bounded by openings 112A and 112B, respectively, of the display holder 112. In displaying a virtual reality scene, the electronic device may display one image within the opening 112A and a related image within the opening 112B. The two images, when perceived by the human brain, may be interpreted as a three-dimensional image. The lens holder 114 may include an opening on a top, bottom, or side of the space to allow insertion of lenses into the lens holder and alignment of the lenses into openings corresponding to lenses 114A and 114B. Additionally or alternatively, the lens holder 114 may include attachment devices, such as clips or adhesives, that hold lenses 114A and 114B in the lens holder 114.

An enclosure 120 may surround the virtual reality viewer 110 to limit an amount of light entering into the viewer space. Better contrast may be achieved from an electronic display in the display holder 112 when space around the electronic display is dark, or at least bright light, such as sunlight, is limited. The enclosure 120 may include one or more components, such as pieces of paper or card stock, that cover one or more sides of the viewer 110. For example, the enclosure 120 may include a first piece that extends over a top of the viewer 110, a second piece that extends down a left side of the viewer 110, and a third piece that extends down a right side of the viewer 110. In some embodiments, a bottom cover for the viewer 110 may also be included in the enclosure 120. One or more of the pieces of the enclosure 120 may include an opening for inserting an electronic display in the display holder 112. The enclosure 120 may also serve as attachment points for other components of the viewer 110. For example, the lens holder 114 may be attached at each end to one of the pieces of the enclosure 120.

A crease 130 may extend through one or more components of the viewer 110 to allow the viewer 110 to collapse and expand in conjunction with movement of the pages 100A and 100B. For example, the crease 130 may extend transversely through the lens holder to allow the lens holder to fold approximately in half along an axis that is substantially aligned with the intersection of the pages 100A and 100B. Likewise, the crease 130 may extend through a top component of the enclosure 120 to allow the enclosure 120 to collapse by folding outward and away from the lens holder 114 when the pages 100A and 100B are pivoted to a close position. Still further, the crease 130 may extend through the display holder 112 such that the display holder may also fold approximately in half along an axis that is substantially aligned with the intersection of pages 100A and 100B. The crease 130 may extend through other components of the viewer 110. In some embodiments, additional creases may be present to allow collapsing and expanding of the viewer 110.

Figure 2:
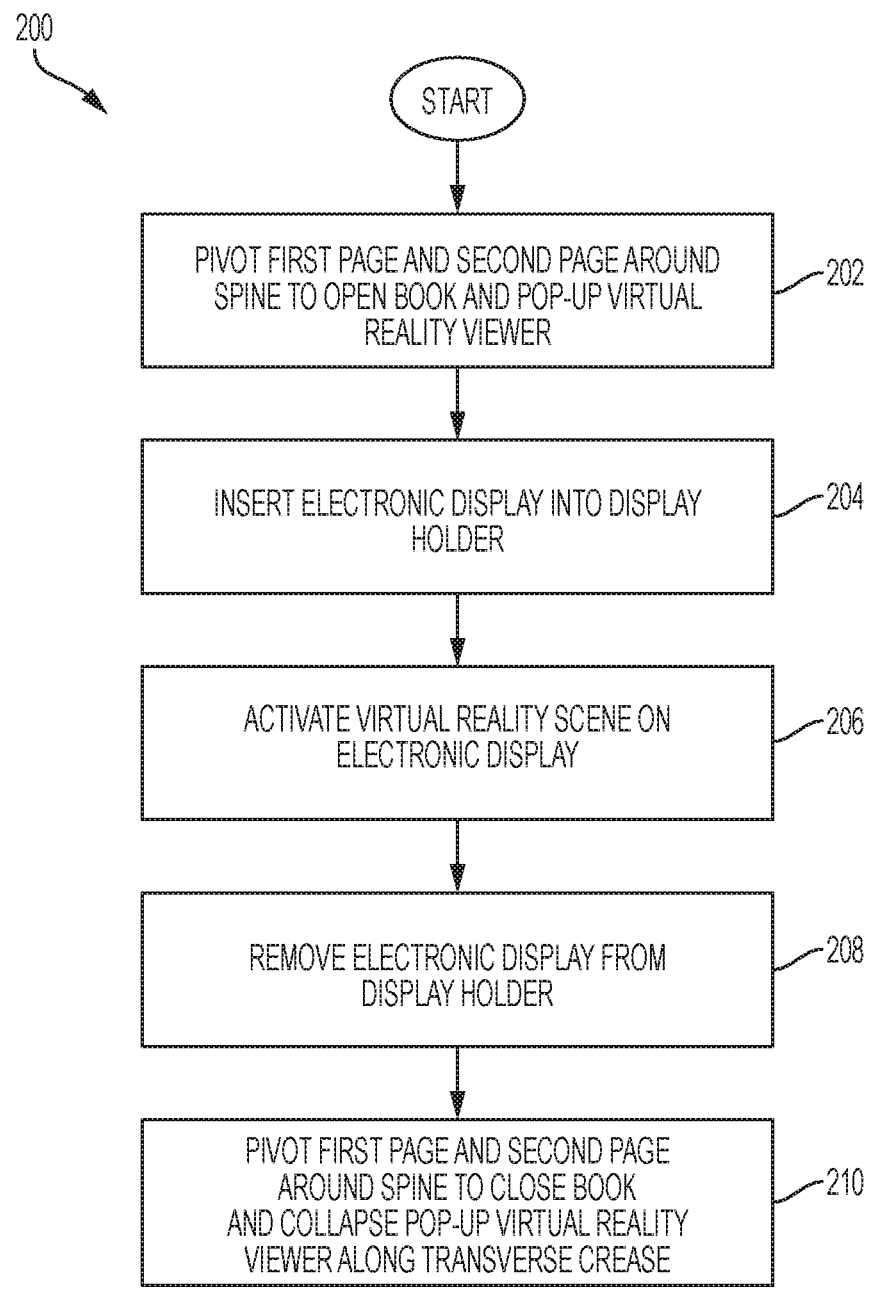
FIG. 2 is a flow chart illustrating example operation of the pop-up virtual reality viewer to display a virtual reality scene on an electronic display according to some embodiments of the disclosure.

Operation of the pop-up virtual reality viewer is described with reference to FIG. 2. FIG. 2 is a flow chart illustrating example operation of the pop-up virtual reality viewer to display a virtual reality scene on an electronic display according to some embodiments of the disclosure. A method 200 may begin at block 202 with a user pivoting a first page and a second page around a spine to open a book, causing the virtual reality viewer to pop-up by expanding into an open state. At block 204, a user may insert an electronic display into the display holder. At block 206, a virtual reality scene may be activated on the electronic display. The scene may be activated manually by the user, such as by launching an application on the electronic display before or after inserting into the display holder. The scene may also be activated automatically, such as by the electronic device detecting insertion into the virtual reality viewer and then launching an application that displays the virtual reality scene. In some embodiments, the virtual reality viewer may include components that aid in the detection of insertion, such as by including a quick response (QR) code detectable by a camera coupled to the electronic display, including an radio frequency identifier (RFID) tag detectable by an RF reader coupled to the electronic display, including a magnet detectable by a magnetometer coupled to the electronic display, and/or including a switch that when depressed transmits a wireless or wireline signal that can be received by the electronic display. After a user is done viewing and interacting with the virtual reality scene, the user may remove the electronic display from the display holder at block 208. The electronic display may be returned to a home screen or turned off automatically through a similar process of activation at block 206. Then, at block 210, the user may pivot the first page and the second page around a spine to close the book, and thus collapse the pop-up virtual reality viewer, such as around a transverse crease through the viewer.

Figure 3:
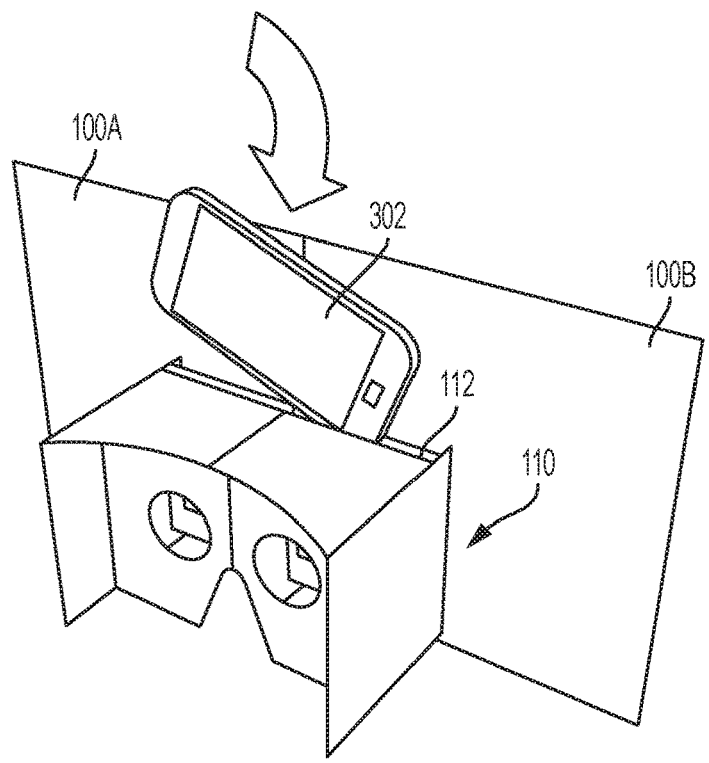
FIG. 3 is a perspective view of a pop-up virtual reality viewer illustrating insertion of an electronic display or mobile device according to some embodiments of the disclosure.
Figure 4:
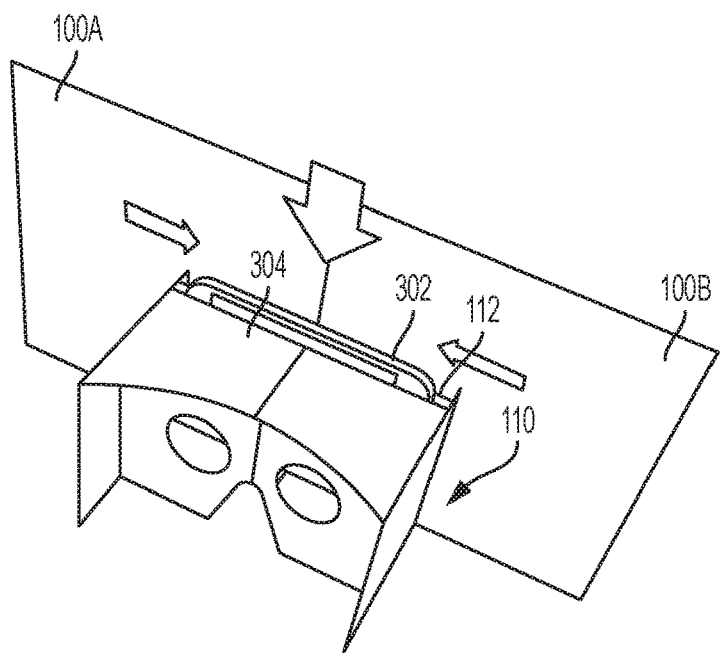
FIG. 4 is a perspective view of a pop-up virtual reality viewer illustrating alignment of the electronic display or mobile device according to some embodiments of the disclosure.

Operation of the pop-up virtual reality viewer by inserting a mobile phone into the display holder of the viewer is shown in FIG. 3 and FIG. 4. FIG. 3 is a perspective view of a pop-up virtual reality viewer illustrating insertion of an electronic display or mobile device according to some embodiments of the disclosure. A mobile device 302 may be inserted into the display holder 112 of the virtual reality viewer 110 when the pages 100A and 100B are open such that the viewer 110 is in a popped-up state. During insertion of the mobile device 302 to the viewer 110, the user may need to align the mobile device 302 to obtain best viewing conditions for a virtual reality scene on the mobile device 302. FIG. 4 is a perspective view of a pop-up virtual reality viewer illustrating alignment of the electronic display or mobile device according to some embodiments of the disclosure. The mobile device 302 may be aligned with a center of the device 302 aligned approximately with an alignment mark 304. In some embodiments, the alignment mark 304 may be the transverse crease 130 along a top portion of the enclosure 120. In other embodiments, a separate printed mark or other feature may be included on the enclosure 120 to assist the user with alignment. The mobile device 302 may also display a line down the center of the electronic display to assist the user with aligning the device in the display holder 112.

Figure 5:
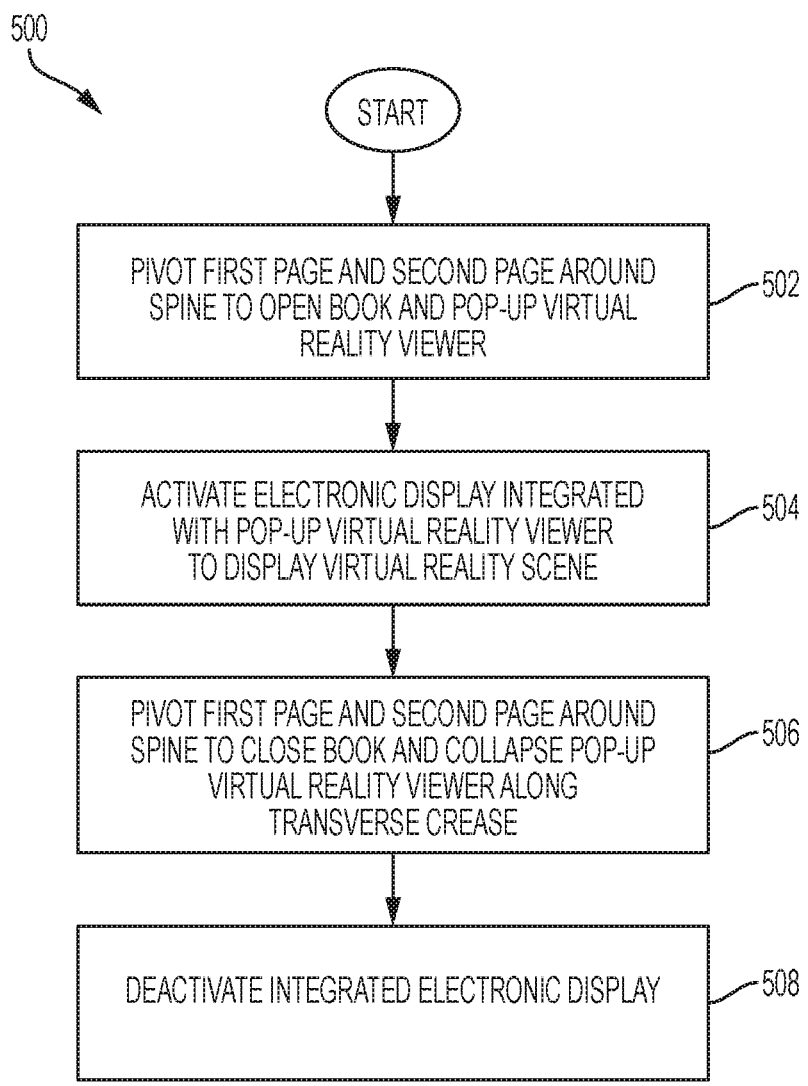
FIG. 5 is a flow chart illustrating example operation of the pop-up virtual reality viewer to display a virtual reality scene on an integrated display according to some embodiments of the disclosure.

In some embodiments, an electronic display may be integrated with the virtual reality viewer, such that the viewer may be operated by a user without inserting an external display, or even without any separate external device. One method of using a viewer with integrated display is shown in FIG. 5. FIG. 5 is a flow chart illustrating example operation of the pop-up virtual reality viewer to display a virtual reality scene on an integrated display according to some embodiments of the disclosure. A method 500 begins at block 502 with a user pivoting a first page and a second page around a spine to open a book and pop-up the virtual reality viewer. Then, at block 504, the user may activate the electronic display integrated with the viewer to display a virtual reality scene. The activation may be performed manually by a user pressing a button or tapping on the screen. The activation may also be performed automatically by the display turning on when the book is opened. For example, a switch or other detection device may determine when the angle of separate between the first page and the second page exceeds a threshold. When that threshold is exceeded a command may be sent to turn on the integrated display. Alternatively, when that threshold is exceeded, a battery switch may be engaged to supply power to the display, which may be programmed to immediately load and display the virtual reality scene. The virtual reality scene for an integrated display may be loaded from memory coupled to the electronic display and also integrated with the viewer or otherwise attached to the pages. The virtual reality scene may alternatively be loaded through a wireless connection to a user's device that retrieves a virtual reality scene, such as from a predefined address on the Internet, and transmits the scene to the electronic display.

Features, components, and configurations of a pop-up virtual reality viewer have been described generically above, and a pop-up virtual reality viewer may include one or more of these features, components, and configurations. One particular embodiment of a virtual reality viewer embodying some of these features, components, and configurations is shown in various states and views in FIG. 6, FIG. 7, FIG. 8, FIG. 9, FIG. 10, FIG. 11, FIG. 12, and FIG. 13.

Figure 6:
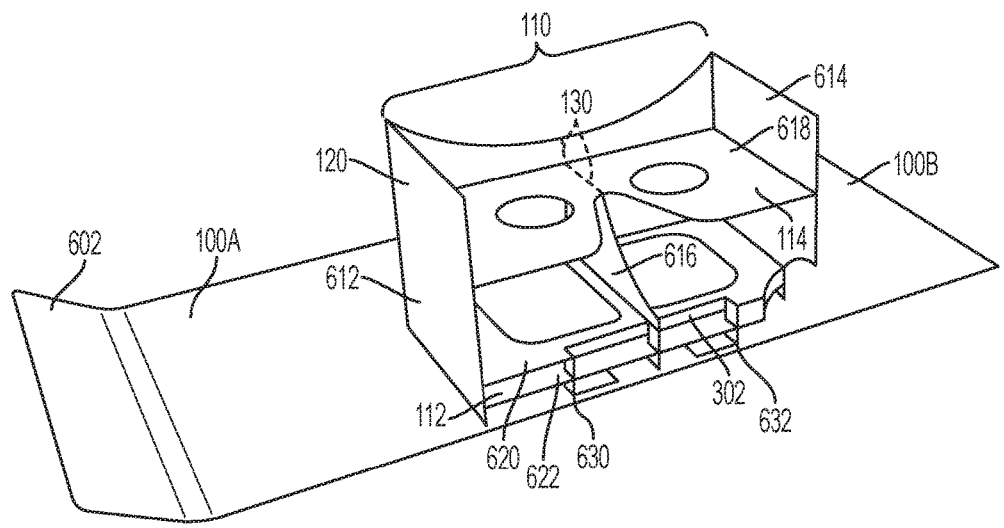
FIG. 6 is a perspective view of a pop-up virtual reality viewer in an open position according to some embodiments of the disclosure.
Figure 7:
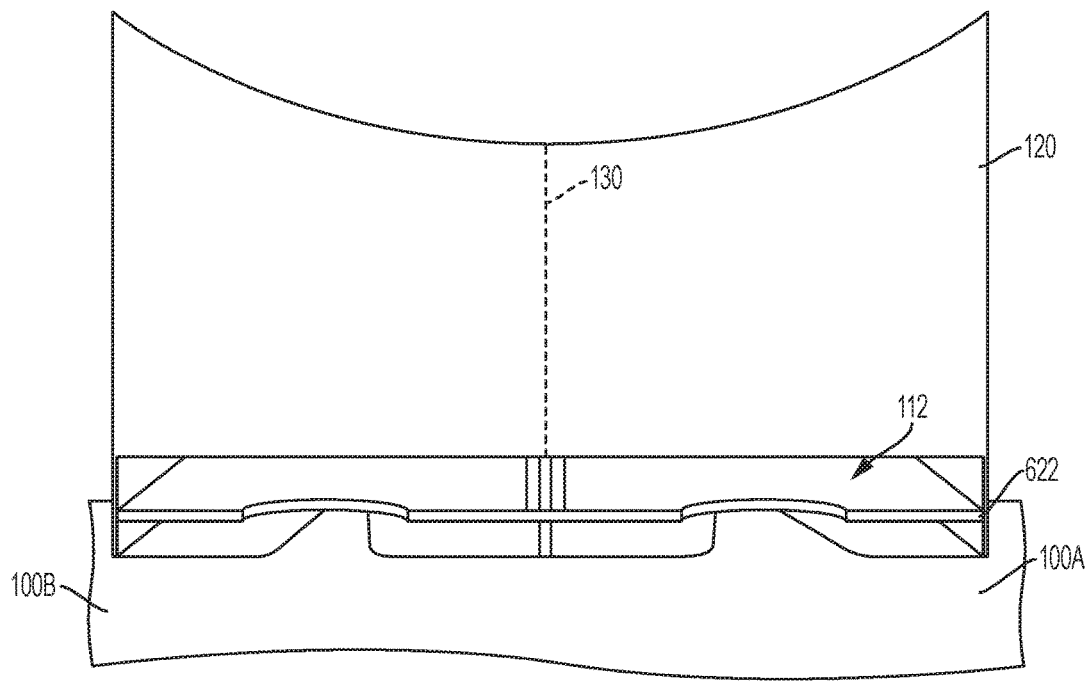
FIG. 7 is a top-down view of a pop-up virtual reality viewer in an open position according to some embodiments of the disclosure.

An open or "popped-up" state of one embodiment of a virtual reality viewer is shown in FIG. 6 and FIG. 7. FIG. 6 is a perspective view of a pop-up virtual reality viewer in an open position according to some embodiments of the disclosure. FIG. 7 is a top-down view of a pop-up virtual reality viewer in an open position according to some embodiments of the disclosure. A viewer 110 may be constructed from components of different type and different size. In one embodiment, the viewer 110 may be constructed from components such as support members 612, 614, 616, 618, 620, and 622 made of card stock paper material. However, in other embodiments, different combinations of different-sized support members, possibly from other materials, may be used to construct the viewer 110 with display holder 112, lens holder 114, and/or enclosure 120.

Support members for the viewer 110 may include latitudinal support members that are attached to the pages 100A and 100B. The latitudinal support members may stand up and generally be directed away from, or out of, the pages 100A and 100B. A support member 612 may be a first latitudinal support member attached to the first page 100A and extending out from the first page 100A when the folding booklet is in an open position. A support member 614 may be a second latitudinal support member attached to the second page 100B and extending out from the second page 100B when the folding booklet is in the open position. A support member 616 may be a third latitudinal support member attached at an intersection of the first page 100A and the second page 100B and extending out from the folding booklet when the folding booklet is in the open position.

Support members for the viewer 110 may also include longitudinal support members that are attached to other support members and extend in a plane approximately parallel to a plane containing the pages 100A and 100B. A support member 618 may be a first longitudinal support member attached to the first latitudinal support member 612, the second latitudinal support member 614, and the third latitudinal support member 616, the first longitudinal support member 618 comprising a crease 130 along a length of the longitudinal support member 618 at a location of an attachment of the first longitudinal support member 618 to the second latitudinal support member 614, and the first longitudinal support member 618 further comprising two openings for lenses. The crease 130 may be a folding joint within the support member 618, or the crease 130 may be a joint between two pieces that together make up the support member 618. That is, where a crease is described throughout this application, a crease refers to a feature that enables the folding of a component or support member. Thus, a fold, a perforation, a joint, or other similar features or connection methods may support the folding of the support member 618 and other support members and components described herein. A support member 620 may be a second longitudinal support member attached to the first latitudinal support member 612, the second latitudinal support member 614, and the third latitudinal support member 616, the second longitudinal support member 620 being configured to collapse around the third latitudinal support member 616 when the folding booklet is in a closed position, and the second longitudinal support member 620 comprising two openings facing toward the first longitudinal support member 618 for viewing the mobile device. The support member 622 may be aligned substantially parallel to the first page and the second page when not closed and may be attached to the pages 100A and 100B by support members 630 and 632, respectively. Support members 622, 630, and 632 may form a support structure for the viewer 110 that provides additional support for holding the weight of the viewer 110 and the electronic display inserted in the display holder 112. A support member 622 may be a third longitudinal support member attached to the first latitudinal support member 612, the second latitudinal support member 614, and the third latitudinal support member 616, the third longitudinal support member 622 being configured to support the mobile device in the pop-up virtual reality viewer 110.

Figure 8:
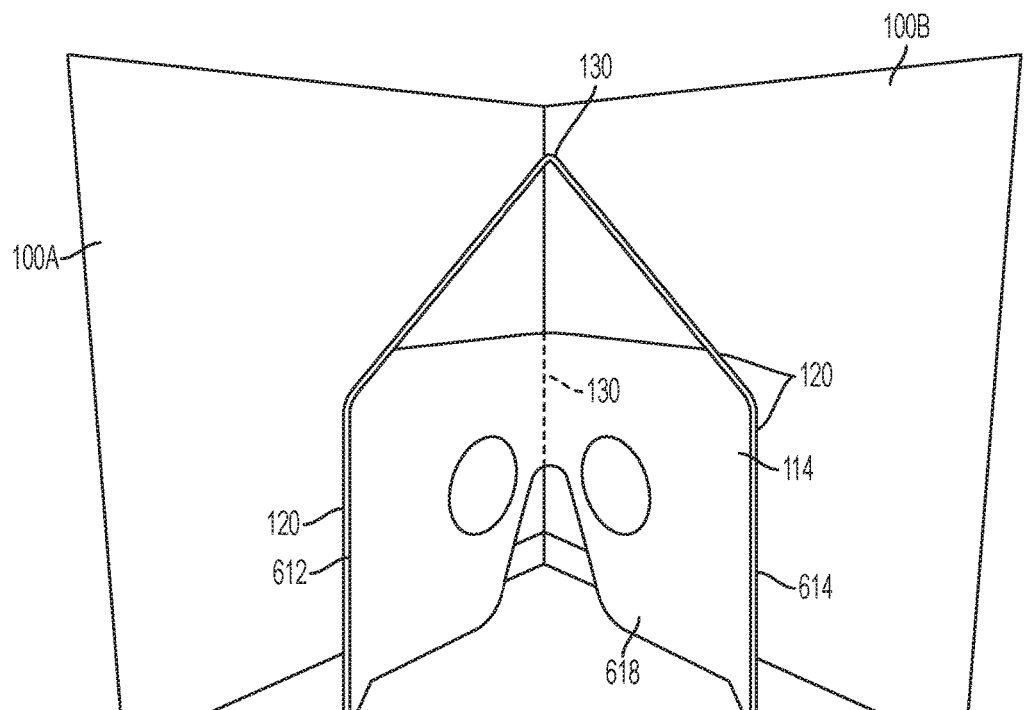
FIG. 8 is a front view of a pop-up virtual reality viewer in a partially open position according to some embodiments of the disclosure.
Figure 9:
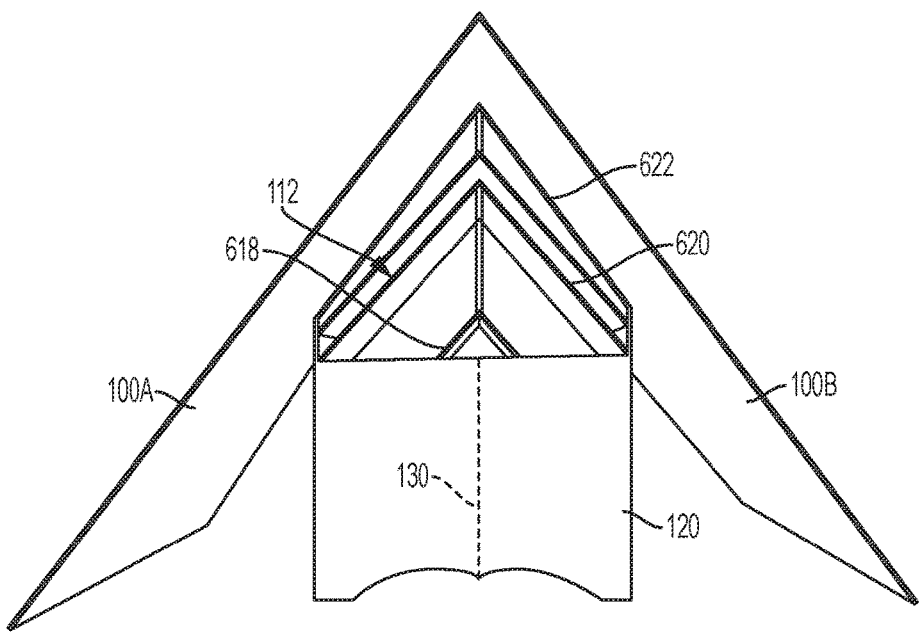
FIG. 9 is a top-down view of a pop-up virtual reality viewer in a partially open position according to some embodiments of the disclosure.
Figure 10:
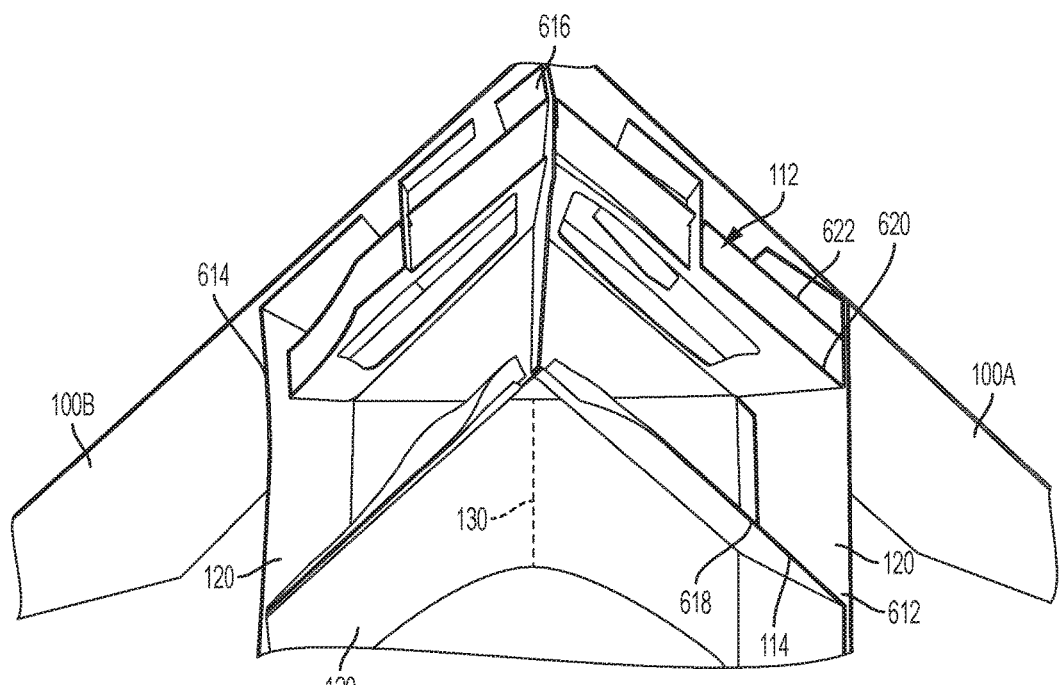
FIG. 10 is a bottom-up view of a pop-up virtual reality viewer in a partially open position according to some embodiments of the disclosure.
Figure 11:
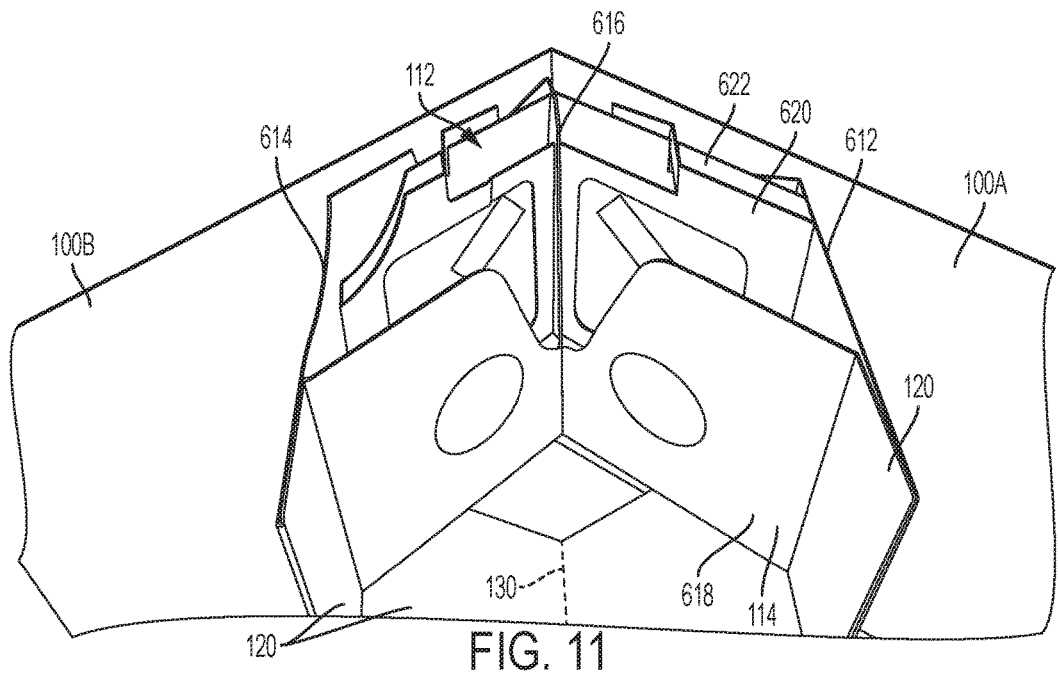
FIG. 11 is a perspective view from below of a pop-up virtual reality viewer in a partially open position according to some embodiments of the disclosure.

A partially closed or partially collapsed state of one embodiment of a virtual reality viewer is shown in FIG. 8, FIG. 9, FIG. 10, and FIG. 11. FIG. 8 is a front view of a pop-up virtual reality viewer in a partially open position according to some embodiments of the disclosure. FIG. 9 is a top-down view of a pop-up virtual reality viewer in a partially open position according to some embodiments of the disclosure. FIG. 10 is a bottom-up view of a pop-up virtual reality viewer in a partially open position according to some embodiments of the disclosure. FIG. 11 is a perspective view of a pop-up virtual reality viewer in a partially open position according to some embodiments of the disclosure.

Figure 12:
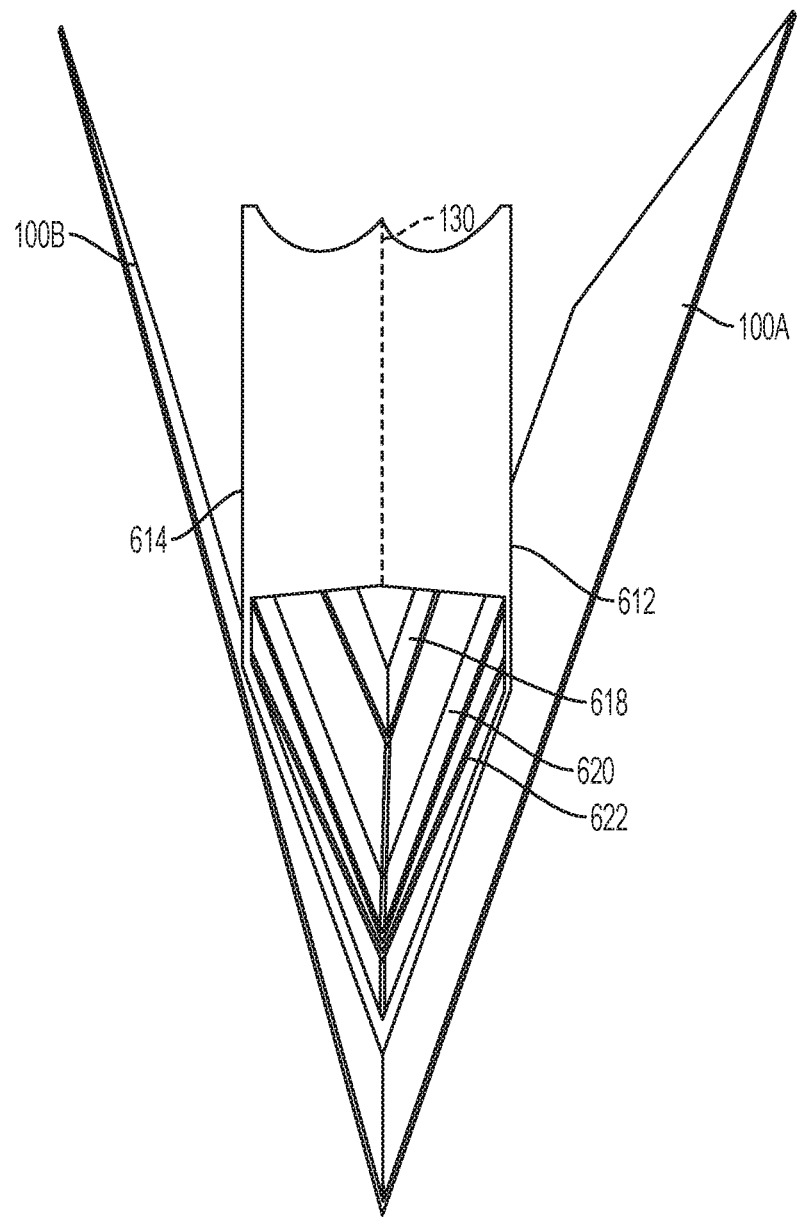
FIG. 12 is a top-down view of a pop-up virtual reality viewer in a nearly closed position according to some embodiments of the disclosure.
Figure 13:
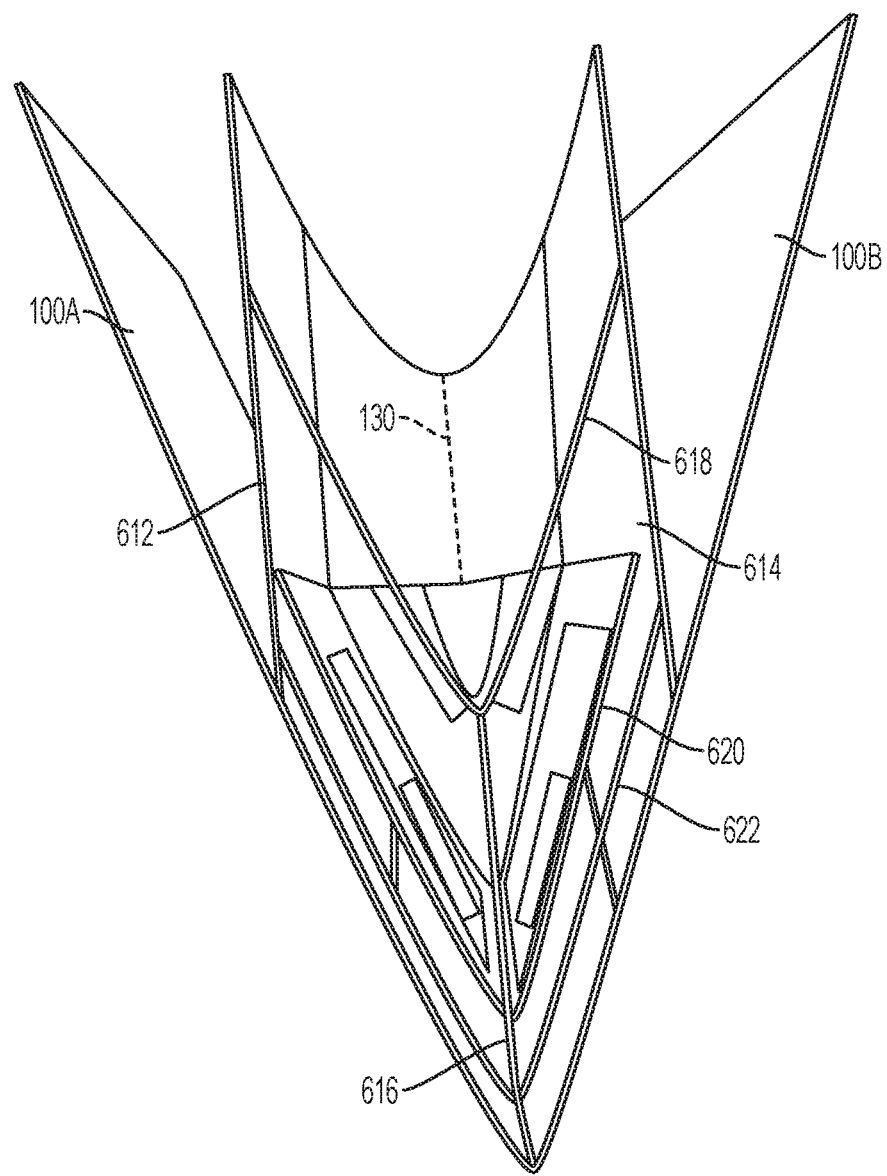
FIG. 13 is a bottom-up view of a pop-up virtual reality viewer in a nearly closed position according to some embodiments of the disclosure.

A nearly-closed or nearly-fully collapsed state of one embodiment of a virtual reality viewer is shown in FIG. 12 and FIG. 13. FIG. 12 is a top-down view of a pop-up virtual reality viewer in a nearly closed position according to some embodiments of the disclosure. FIG. 13 is a bottom-up view of a pop-up virtual reality viewer in a nearly closed position according to some embodiments of the disclosure.

Figure 14:
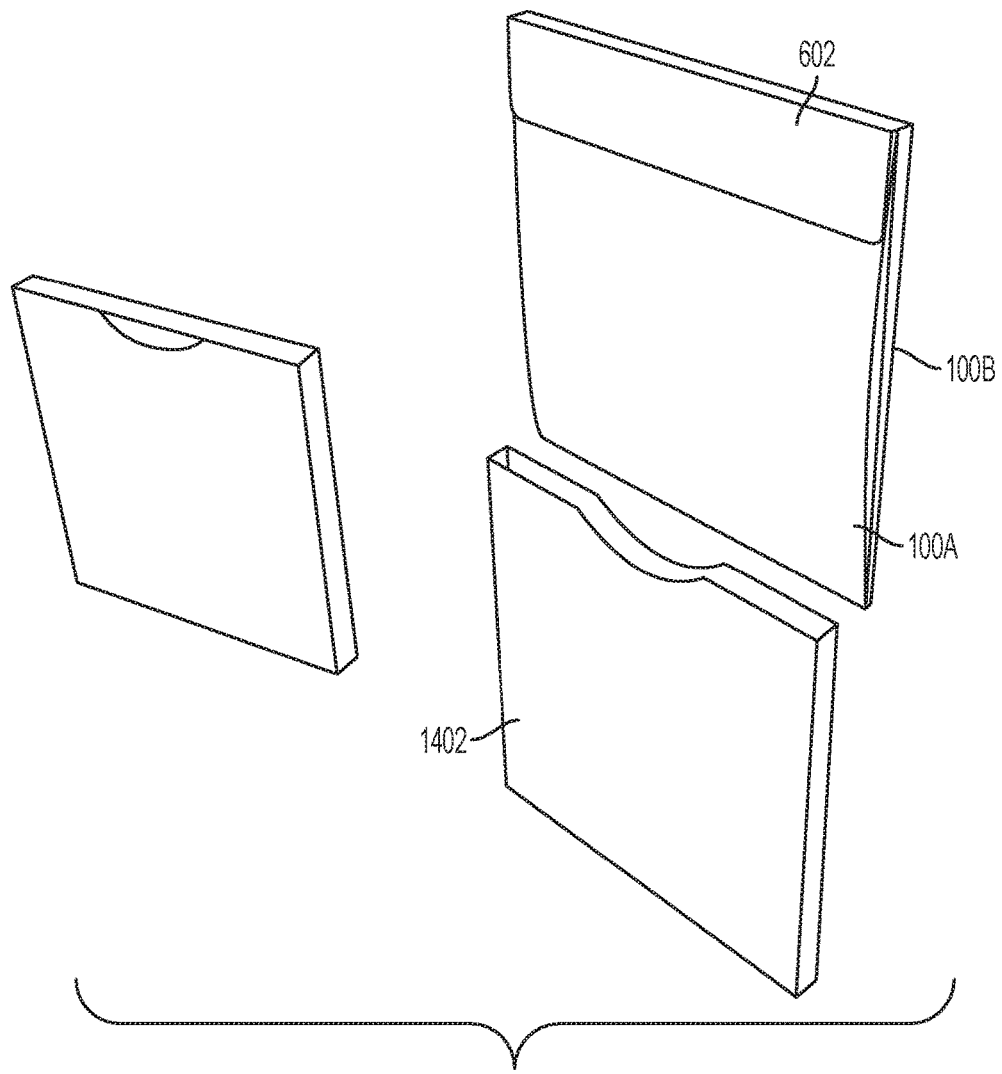
FIG. 14 is a perspective view of printed material with a latch for closing the printed material according to some embodiments of the disclosure.

A closed or collapsed state of one embodiment of a pop-up virtual reality viewer is shown in FIG. 14. FIG. 14 is a perspective view of printed material with a latch for closing the printed material according to some embodiments of the disclosure. The latch 602 may couple the page 100B to the page 100A on a side opposite the binding or other attachment of the pages 100A and 100B to assist in keeping the book closed. A book may be inserted into a sleeve 1402 for transport to further assist in keeping the book closed.

Figure 15:
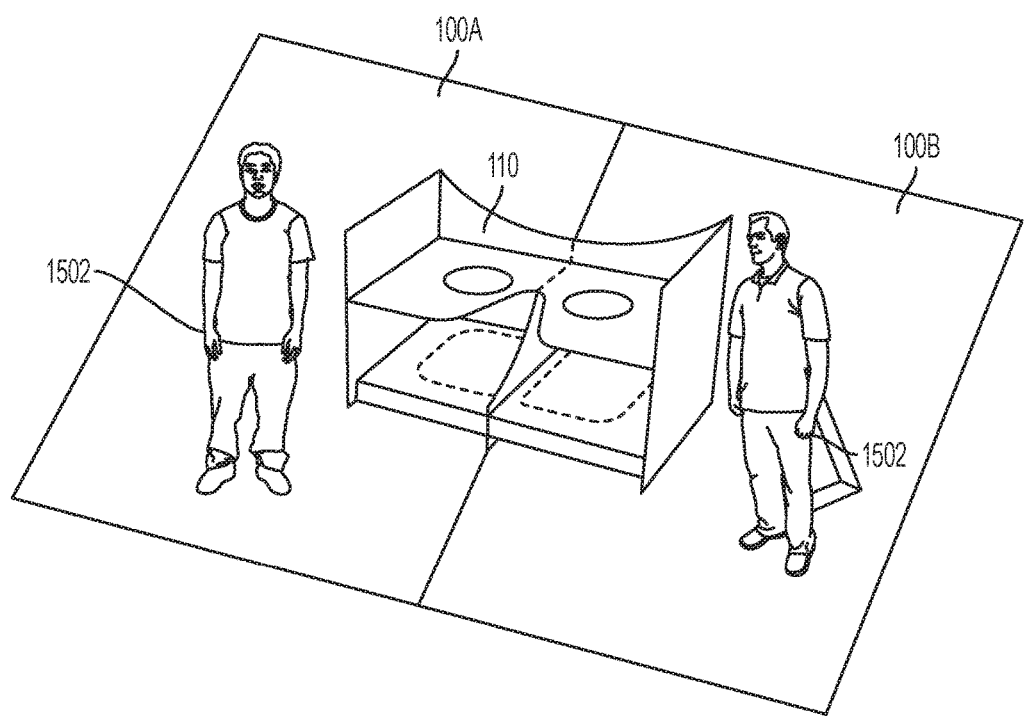
FIG. 15 is a perspective view of a book with pop-up virtual reality viewer and additional pop-up elements according to one embodiment of the disclosure.

In some embodiments, the book or other printed material containing the virtual reality viewer may include additional pop-up elements as shown in FIG. 15. FIG. 15 is a perspective view of a book with pop-up virtual reality viewer and additional pop-up elements according to one embodiment of the disclosure. Additional pop-up elements 1502 may be attached to pages 100A and/or 100B around the virtual reality viewer 110. The pop-up elements 1502 may further enhance a reader's viewing of the virtual reality scene by displaying related content for viewing by the user before and after placing their head inside the viewer 110. In some embodiments, the book or other printed materials may include additional pages bound to the pages 100A and 100B. The additional pages may display other content or related content. Further, additional viewers may be attached to these other pages. In some embodiments, each of the viewers in a book may have a different identifier, such as QR code or RFID tag, to load different content when an electronic display is inserted into each of the viewers. Thus, for example, in a children's book each page may contain pop-ups and/or printed content related to a different story and when the electronic display is inserted into the viewer 110 the story may play on the display. In another example, in a product catalog each page may contain pop-ups and/or printed content related to different products and when the electronic display is inserted into the viewer 110 a virtual reality scene showing the product may play on the display.

The schematic flow chart diagrams of FIG. 2 and FIG. 5 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Some functions related to the virtual reality viewer may be performed on a mobile device, and the mobile device may implement methods, such as in firmware or software, to support operation of the pop-up virtual reality viewer. For example, the mobile device may include software that recognizes RFID tags, QR codes, or other identification labels on the viewer. Further, the mobile device may include software that plays back virtual reality scenes for viewing through the viewer. That software may include functionality for alignment or other configuration parameters for preparing and optimizing the viewing of virtual reality scenes using the pop-up viewer.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. For example, "pages" as described for attaching the pop-up virtual reality viewer may include any sheet of material with or without printing on the page. In some embodiments, the "pages" may be plain cardboard stock, plain plastic sheets, glossy paper with printed pictures and/or text, cardboard stock with printed pictures and/or text, laminated paper with printed pictures and/or text, or the like. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
   a first page and a second page, the first page and the second page being pivotably connected to one another at one end of each of the first page and the second page;
   a virtual reality viewer for viewing a virtual reality scene on an electronic display, the virtual reality viewer being attached at a first side to the first page and at a second side to the second page, and the virtual reality viewer comprising:
      a display holder configured to hold the electronic display;
      a lens holder attached to the display holder and configured to hold lenses for viewing the virtual reality scene,
      the display holder and the lens holder each comprising a transverse crease configured to allow the virtual reality viewer to be collapsed around an axis associated with the transverse crease when the first page and the second page are closed.

2. The apparatus of claim 1, wherein the display holder comprises a mobile device holder configured to hold a mobile device for viewing the virtual reality scene on the electronic display of the mobile device.

3. The apparatus of claim 2, wherein the transverse crease is aligned approximately in a middle of the mobile device holder, and the transverse crease is configured to align with an alignment line displayed on a screen of the mobile device.

4. The apparatus of claim 2, the mobile device holder comprising a quick response (QR) barcode configured with an address of materials associated with content on at least one of the first page and the second page.

5. The apparatus of claim 4, the apparatus further comprising one or more pop-up structures attached to at least one of the first page and the second page, the one or more pop-up structures being configured to expand and collapse based on an orientation of the first page to the second page, and the one or more pop-up structures being associated with the content on at least one of the first page and the second page.

6. The apparatus of claim 2, the mobile device holder comprising a radio frequency identification (RFID) tag configured with an address of materials associated with content on at least one of the first page and the second page.

7. The apparatus of claim 6, the apparatus further comprising one or more pop-up structures attached to at least one of the first page and the second page, the one or more pop-up structures being configured to expand and collapse based on an orientation of the first page to the second page, and the one or more pop-up structures being associated with the content on at least one of the first page and the second page.

8. The apparatus of claim 1, the virtual reality viewer further comprising a support structure attached to the display holder and attached to at least one of the first page and the second page.

9. The apparatus of claim 8, the support structure comprising a first member aligned substantially parallel to the first page and the second page when not closed, and the support structure further comprising at least two second members aligned substantially perpendicular to the first member and attached between the first member and at least one of the first page and the second page.

10. The apparatus of claim 1, the display holder comprising two openings facing from the display holder toward the lens holder, and the two openings being aligned with two lenses in the lens holder.

11. The apparatus of claim 10, the transverse crease being located between the two openings of the display holder.

12. The apparatus of claim 1, further comprising one or more pop-up structures attached to at least one of the first page and the second page, the one or more pop-up structures being configured to expand and collapse based on an orientation of the first page to the second page.

13. The apparatus of claim 1, further comprising an enclosure at least partially surrounding the display holder and the lens holder and configured to block at least some external light from entering a space between the display holder and the lens holder.

14. The apparatus of claim 13, the enclosure comprising a transverse crease along at least one side, the transverse crease of the enclosure aligning with the transverse crease of the display holder and the lens holder.

15. The apparatus of claim 14, the enclosure being configured to collapse when the first page and the second page are closed by folding along the transverse crease of the enclosure and extending away from the display holder and the lens holder.

16. The apparatus of claim 1, further comprising a latch attached to the first page, the latch being configured to fold over the second page to apply a force for holding the first page and the second page closed when the latch is engaged.

17. The apparatus of claim 1, the electronic display being integrated with the display holder.

18. The apparatus of claim 17, the electronic display being configured to activate when the first page and the second page are pivotably moved to pop-up the virtual reality viewer.

19. An apparatus, comprising:
   a folding booklet comprising a first page and a second page, the a first face of the first page facing toward a second face of the second page;
   a pop-up virtual reality viewer for viewing a virtual reality screen on a mobile device, the viewer being attached to the folding booklet at a first side to the first page and at a second side to the second page, the pop-up virtual reality view comprising:
      a first latitudinal support member attached to the first page and extending out from the first page when the folding booklet is in an open position;
      a second latitudinal support member attached to the second page and extending out from the second page when the folding booklet is in the open position;
      a third latitudinal support member attached to an intersection of the first page and the second page and extending out from the folding booklet when the folding booklet is in the open position;
      a first longitudinal support member attached to the first latitudinal support member, the second latitudinal support member, and the third latitudinal support member, the first longitudinal support member comprising a crease along a length of the longitudinal support member at a location of an attachment of the first longitudinal support member to the second latitudinal support member, and the first longitudinal support member further comprising two openings for lenses;
      a second longitudinal support member attached to the first latitudinal support member, the second latitudinal support member, and the third latitudinal support member, the second longitudinal support member being configured to collapse around the second latitudinal support member when the folding booklet is in a closed position, and the second longitudinal support member comprising two openings facing toward the first longitudinal support member for viewing the mobile device; and a third longitudinal support member attached to the first latitudinal support member, the second latitudinal support member, and the third latitudinal support member, the third longitudinal support member being configured to support the mobile device in the pop-up virtual reality viewer.

20. The apparatus of claim 19, the two openings of the second longitudinal support member being aligned with the two openings of the first longitudinal support member and configured to provide stereoscopic viewing of content on the mobile device.

21. The apparatus of claim 19, wherein the folding booklet further comprising one or more pop-up structures attached to at least one of the first page and the second page, the one or more pop-up structures being configured to expand and collapse based on an orientation of the first page to the second page, and the one or more pop-up structures being associated with the content on at least one of the first page and the second page.

22. The apparatus of claim 19, the pop-up virtual reality viewer comprising a quick response (QR) barcode configured with an address of materials associated with content on at least one of the first page and the second page.

23. The apparatus of claim 19, the pop-up virtual reality viewer comprising a radio frequency identification (RFID) tag configured with an address of materials associated with content on at least one of the first page and the second page.

* * * * *